United States Patent [19]

Iwata et al.

[11] Patent Number: 4,635,604
[45] Date of Patent: Jan. 13, 1987

[54] ENGINE IGNITION TIMING CONTROL APPARATUS

[75] Inventors: Toshio Iwata, Mitachi; Satoshi Komurasaki; Atsushi Ueda, both of Himeji, all of Japan

[73] Assignee: Mitsubishi Denki Kabushiki Kaisha, Japan

[21] Appl. No.: 704,579

[22] Filed: Feb. 22, 1985

[30] Foreign Application Priority Data

Feb. 24, 1984 [JP] Japan .................................. 59-34573
Feb. 24, 1984 [JP] Japan .................................. 59-34574

[51] Int. Cl.$^4$ ............................................... F02P 5/15
[52] U.S. Cl. ................................................... 123/425
[58] Field of Search ...................... 123/425, 435; 73/35

[56] References Cited

U.S. PATENT DOCUMENTS

| 3,718,126 | 2/1973 | Oishi et al. ........................... 123/117 |
| 3,822,583 | 7/1974 | Keller et al. . |
| 4,344,400 | 8/1982 | Asano .................................. 123/425 |
| 4,351,281 | 9/1982 | Geiger et al. ........................ 123/425 |
| 4,440,129 | 4/1984 | Iwata .................................... 123/425 |
| 4,444,172 | 4/1984 | Sellmaier et al. .................... 123/425 |
| 4,448,163 | 5/1984 | Yoshida ........................... 123/425 X |
| 4,463,565 | 8/1984 | Rydquist et al. ................ 123/425 X |
| 4,509,331 | 4/1985 | Hirabayashi .................... 123/425 X |

FOREIGN PATENT DOCUMENTS

| 27886 | 2/1983 | Japan .................................. 123/425 |
| 57-072 | 4/1983 | Japan . |
| 143169 | 8/1983 | Japan .................................. 123/425 |

Primary Examiner—Tony M. Argenbright
Attorney, Agent, or Firm—Leydig, Voit & Mayer

[57] ABSTRACT

An ignition timing control apparatus for an internal combustion engine in which the reference ignition timing of the engine is changed over or displaced according to the detected result of the occurrence of knocks owing to the kind of fuel being used for the engine. In changing over the ignition timing characteristic, the change-over magnitude between the reference ignition timings for premium and regular gasolines is determined according to an operating condition of the engine whereby a knock control is made based on the determined change-over magnitude. In displacing the ignition timing when a mixture of premium and regular gasolines is being used, the displacement magnitude for either of the reference ignition timings for premium and regular gasolines is determined according to an operating condition of the engine whereby a knock control is made based on the determined displacement magnitude.

19 Claims, 23 Drawing Figures

ENGINE IGNITION TIMING CONTROL APPARATUS

BACKGROUND OF THE INVENTION

This invention relates to an ignition timing control apparatus for an internal combustion engine, and in particular to an ignition timing control apparatus for an internal combustion engine which is operable either with a low-octane rating fuel or a high-octane rating fuel, or with a mixture thereof.

It is well known in the art that the octane rating of fuel gasoline is greatly interrelated with a knock-resistibility in an internal combustion engine. Namely, as the octane rating of gasoline becomes higher, the knocking of an engine correspondingly decreases.

FIG. 1 shows an ignition timing vs output shaft torque characteristic in an internal combustion engine in the case where a commercially available low-octane gasoline (regular gasoline) and a commercially available high octane gasoline (premium gasoline) of which the octane rating is higher than that of low-octane gasoline. In the figure, point A indicates a knock limit for low-octane gasoline, point B indicates a knock limit for high-octane gasoline, and point C indicates a Minimum advance for Best Torque (MBT), in which knock arises when the angle of the ignition timing is advanced beyond these points.

According to FIG. 1, it is possible to advance the angle of the ignition timing up to a point B when high-octane gasoline is used, where the output shaft torque will be higher as compared with the use of low-octane gasoline.

FIGS. 2 and 3 show ignition timing characteristics of points A, B, and C in FIG. 1 respectively represented as a function of a revolutional speed of an internal combustion engine (FIG. 2) and a function of a load of the engine (FIG. 3).

Thus, in an engine associated with such a characteristic, in the case where regular and premium gasolines are alternatively used and the ignition timing of the engine is changed over to have an optimum value according to the kind of gasoline in use, or in the case where a mixture of both gasolines is used and the ignition timing is advanced corresponding to the mixing ratio of regular and premium gasolines, the output of the engine can be enhanced.

However, in a conventional control apparatus for an internal combustion engine, the reference ignition timing characteristic is preset only for a predetermined octane rating gasoline, e.g. the low-octane rating regular gasoline. Therefore when the gasoline of the engine is changed over from the low octane rating gasoline to the high octane rating gasoline or when both of the gasolines are mixed in use, an increase in the output of the engine can not be expected without any change or modification thereof, so that the presetting of the reference ignition timing must be repeated towards an advance angle, by some method.

Particularly, such a repeated presetting of the reference ignition timing is very hard when using mixed gasoline because the knock limit exists between curves A and B depending on the mixture ratio and so the possible advance angle limit is variable.

Moreover, upon the presetting, an advance angle characteristic different from that of the regular gasoline is required to be set as the ignition timing because of the difference in the advance angle characteristic between the knock limits A, B and the MBT point C as shown in FIGS. 2 and 3.

It has been also considered that by means of a knock control technique, which will be hereinafter described in the embodiments of this invention, for detecting engine knocks and controlling the ignition timing to the knock occurrence limit, the reference ignition timing characteristic be preset to point B in FIG. 1 for premium gasoline and that when using the regular gasoline, the ignition timing be retarded to point A in FIG. 1 by means of the above knock control technique. In this case, however, because of the broad ignition timing interval for a knock control between points A and B in FIG. 1, when knocks arise during an acceleration operation etc., of the engine, intensive knocks disadvantageously arise during the retarding shift of the ignition timing from point B to point A in FIG. 1.

Even if the reference ignition timing has been again preset at the knock limit A or B, since the knock limits A and B in FIG. 1 vary with environmental conditions during the operation of the engine such as temperature, humidity, etc, there is a possibility that knocks will arise due to such variations in environmental conditions.

Furthermore, depending on the operating region of the engine, there is a case where an accurate determining operation of an octane rating can not be done.

U.S. Pat. No. 3,822,583, titled "Method for Determining Octane Rating of Fuels under Road Conditions" discloses measuring the octane rating of a fuel used for an engine by the detection of knocks.

Japanese Patent Application Laid-open No. 58-57072, published on Apr. 5, 1983, titled "Method for Controlling Ignition Timing of Electronic Controlled Engine" discloses a change-over the ignition timing of the engine depending on the octane rating of a fuel.

SUMMARY OF THE INVENTION

It is accordingly an object of the invention to provide an ignition timing control apparatus for an internal combustion engine wherein the kind of gasoline used for the engine is determined to change over the reference ignition timing of the engine and the magnitude of the change-over is corrected according to the operating condition of the engine.

In order to accomplish this object, an ignition timing control apparatus for an internal combustion engine according to the present invention comprises: a sensing means for sensing vibrations including knocks in the engine; knock signal deriving means for deriving knock signals from the output of the sensing means; an ignition timing change-over determining means for determining from knock signals derived by the knock signal deriving means whether or not the change-over of the reference ignition timing is necessary from the knock condition associated with a fuel used for said engine; a change-over magnitude determining means for correcting the change-over magnitude of the reference ignition timing according to the operating condition of said engine and the output of said ignition timing change-over determining means; and, an ignition timing change-over means for changing over the reference ignition timing according to the output of said change-over magnitude determining means.

It is another object of this invention to provide an ignition timing control apparatus for an internal combustion engine wherein an ignition timing displacement magnitude based on the mixing ratio of premium and regular gasolines is determined according to an operating condition of the engine to provide an optimum reference ignition timing for the engine.

In order to accomplish this object, an ignition timing control apparatus for an internal combustion engine according to the present invention comprises: a sensing means for sensing vibrations including knocks in the engine; knock signal deriving means for deriving knock signals from the output of said sensing means, for deriving said knock signals; a displacement magnitude determining means for determining from the output of the knock signal deriving means a displacement magnitude for the reference ignition timing of the engine; an ignition timing displacement means for displacing the reference ignition timing by the displacement magnitude according to the output of the displacement magnitude determining means; and, a correction means for correcting the displacement magnitude for the reference ignition timing according to the operating condition of the engine.

BRIEF DESCRIPTION OF THE DRAWINGS

Throughout the figures, the same reference numerals indicate identical or corresponding portions and element.

DETAILED DESCRIPTION OF THE PREFERRED EMBODIMENTS

The present invention will now be described in detail along the preferred embodiments illustrated in the accompanying drawings.

Figure 4:
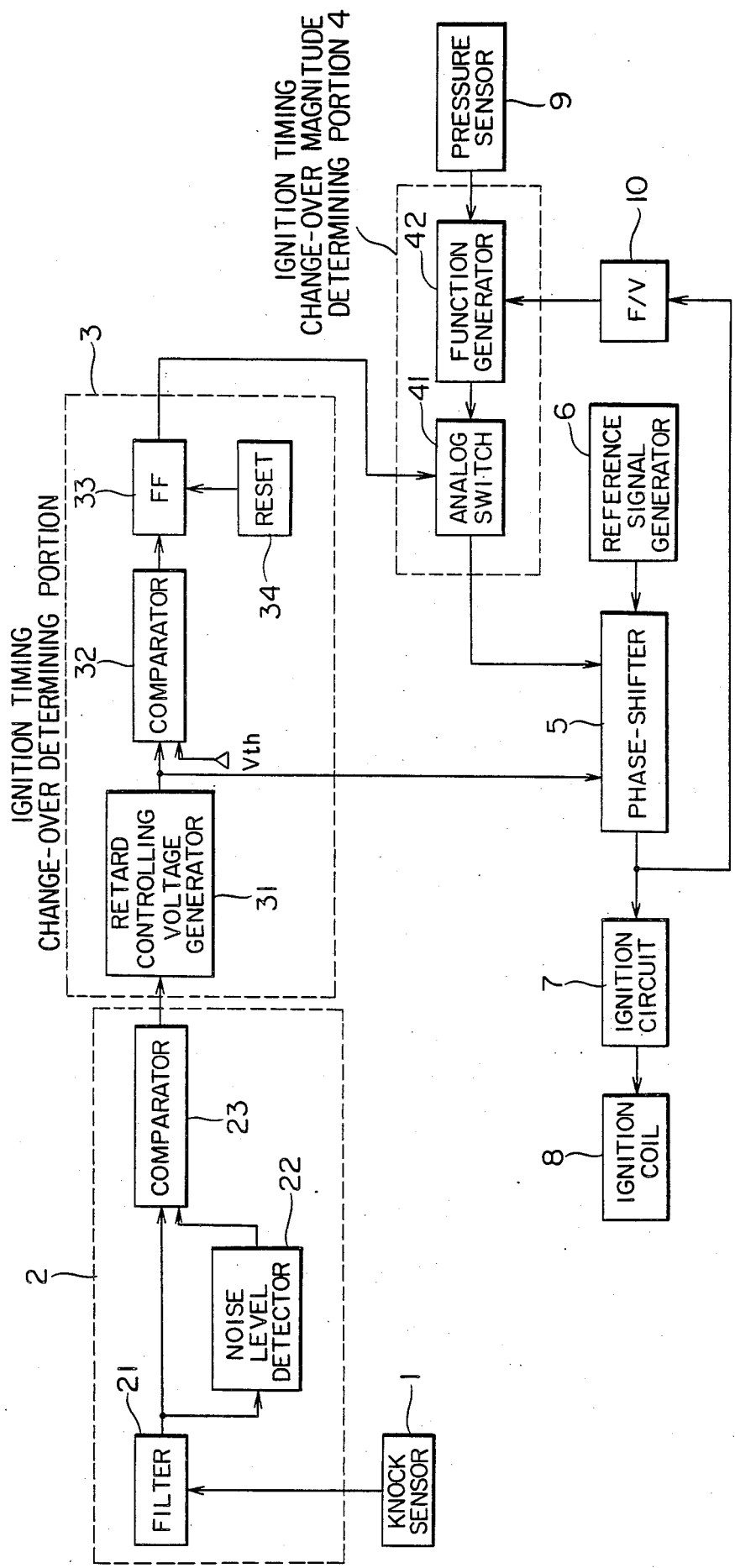
FIG. 4 shows a block diagram of a first embodiment of an ignition timing control apparatus for an internal combustion engine in accordance with this invention.

FIG. 4 shows a first embodiment of this invention, where a knock sensor 1 is mounted on an internal combustion engine (not shown) to sense knocks in the engine. The output signal of the knock sensor 1 is received as an input by a knock signal deriving portion 2, enclosed with dotted lines, which is composed of a bandpass filter 21, a noise level detector 22, and a first comparator 23. The input of the bandpass filter 21 is connected to the knock sensor 1 and the output thereof is connected to the noise level detector 22 and one input of the first comparator 23. The output of the noise level detector 22 is connected to the other input of the first comparator 23.

The knock signal deriving portion 2 is connected to a retard controlling voltage generator 31. This retard controlling voltage generator 31 is connected to a second comparator 32 which in turn is connected to a flip-flop 33. The flip-flop 33 is reset by a reset circuit 34. It is to be noted that the retard controlling voltage generator 31, the comparator 32, the flip-flop 33, and the reset circuit 34 together form an ignition timing change-over determining portion 3.

The second comparator 32 compares the output voltage of the retard controlling voltage generator 31 with a predetermined voltage level Vth to provide as an output therefrom a compared result to the set input of the flip-flop 33. The output of the flip-flop 33 in the ignition timing change-over determining portion 3 is connected to one input of an analog switch 41 the other input of which is connected to the output of a function generator 42. The analog switch 41 and the function generator 42 together form an ignition timing change-over magnitude determining portion 4 which is connected to the output of an operating condition sensing means, herein shown in part as a pressure sensor 9, for detecting an inlet air pressure of the engine and to the output of a frequency-voltage converter 10. The outputs of the retard controlling voltage generator 31 and the analog switch 41 are both connected to a retard controlling input of an ignition timing phase-shifter 5 for phase-shifting or retarding a reference ignition timing preset in a reference ignition timing signal generator 6 in accordance with the output voltage of the retard controlling voltage generator 31 and the output voltage of the function generator 42 through the analog switch 41 and provides as an output therefrom an ignition signal indicative of the retarded ignition timing to an ignition circuit 7 which causes an ignition coil 8 to develop thereacross a high voltage necessary for the ignition of the engine. A frequency-voltage (F/V) converter 10 receives as an input an ignition signal provided as an output from the phase-shifter 5 and converts the frequency of the same into a voltage, thereby providing as an output therefrom a voltage corresponding to the revolution of the engine.

Figure 5:
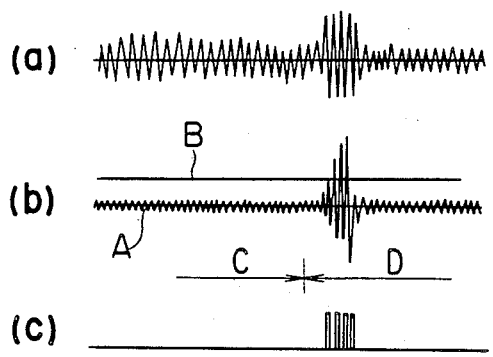
FIGS. 5(a)–5(c) shows waveform graphs for explaining the operation of the knock signal deriving portion in FIG. 4.
Figure 6:
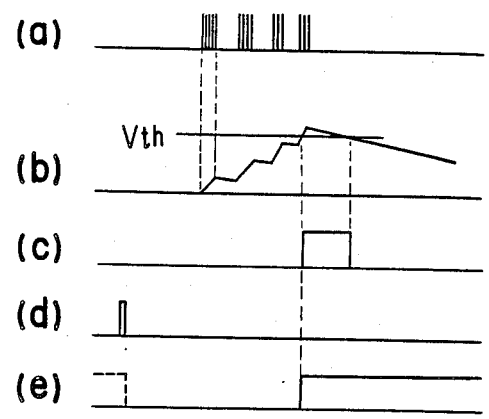
FIGS. 6(a)–6(e) shows waveform graphs for explaining the operations of the various portions of the control apparatus used in FIG. 4.

The operation of each of the block portions in FIG. 4 will now be described with reference to FIGS. 5 and 6 showing waveforms indicating the operation of each of the circuits.

The knock sensor 1 is a vibration acceleration sensor generally well known as being mounted on the cylinder block (not shown) etc., of an engine, which converts the mechanical vibration into an electrical signal, and generates a vibration wave signal, as shown in FIG. 5(a), which is received by the bandpass filter 21. The bandpass filter 21 only passes therethrough a frequency component inherent in knocks, from the output signal of the knock sensor 1, thereby suppressing a noise component not relating to knocks to provide as an output a signal having a good S/N ratio as shown in FIG. 5(b) by wave-form A.

The noise level detector 22 may be composed of, e.g. a half-wave rectifying circuit, an averaging circuit, and an amplifying circuit etc. The noise level detector 22 converts the output of the bandpass filter 21 (FIG. 5(b), wave-form A) into a DC voltage by the half-wave rectification and the averaging operations, the DC voltage being amplified with a predetermined amplification to have a level, as shown in FIG. 5(b) by a wave-form B, higher than the noise component of the output signal of the bandpass filter 21 (FIG. 5(b), wave-form A) but lower than the knock component of the same.

The comparator 23 compares the output signal of the noise level detector 22 (FIG. 5(b), wave-form B) with the output of the bandpass filter 21 (FIG. 5(b), wave-form A). In the case where no knock occurs (FIG. 5, section C), since the output signal of the bandpass filter 21 (FIG. 5(b), wave-form A) is not greater than the output signal of the noise level detector 22 (FIG. 5(b), wave-form B), the comparator 23 provides no output, while in the case where knocks occur (FIG. 5, section D), since the former signal is greater than the latter signal, the comparator 23 provides as an output therefrom a pulse train as shown in FIG. 5(c). Accordingly, the output pulse train from the comparator 23 can be used for determining whether or not knocks have occurred.

FIG. 6 shows waveforms indicating the operation of the ignition timing change-over determining portion 3 which includes the retard controlling voltage generator 31, the comparator 32, and the flip-flop 33. The retard controlling voltage generator 31 may be composed of e.g. an integration circuit which, when the first comparator 23 provides as an output therefrom a pulse train as shown in FIG. 6(a), integrates the pulse train to raise the output voltage as shown in FIG. 6(b). On the other hand, when the first comparator 23 provides no output pulse train, indicating the absence of knocks, the output of the voltage generator 31 gradually falls at a predetermined rate. Consequently, the voltage generator 31 generates a retard controlling voltage for retarding the ignition timing up to the knock limit point on a real time basis, whereby the ignition timing phase-shifter 5 receives as an input the retard controlling voltage to retard the angle of the ignition timing, thereby suppressing the occurrence of knocks.

On the other hand, the output level of the second comparator 32 is inverted from a low level to a high level as shown in FIG. 6(c) when the retard controlling voltage from the voltage generator 31 exceeds the predetermined threshold level Vth. This threshold level Vth is predetermined such that in the case where the reference ignition timing is preset for that of premium gasoline, the retard controlling voltage does not go above Vth when premium gasoline is used while it does not go below Vth when regular gasoline is used.

The flip-flop 33 is set to provide a high logic level output when the output of the comparator 32 is at the high level and reset to provide a low logic level output when the output of the reset circuit 34 is at a high level. The reset circuit 34 provides as an output therefrom a high level pulse, e.g. at the starting time of the engine, as shown in FIG. 6(d). The output state of the flip-flop 33 is shown in FIG. 6(e).

At the starting time of the engine, the flip-flop 33 is reset by the reset circuit 34 to provide a low level output signal as above described. This signal indicates a "premium gasoline mode" in which the ignition timing of the engine is not changed over. When the output of the comparator 32 becomes the high level as shown in FIG. 6(c), the output of the flip-flop 33 is changed over to the high level, which indicates a "regular gasoline mode" in which the ignition timing of the engine is changed over. Thereafter, the regular gasoline mode is retained until the engine is stopped. It is needless to say that if the output of the comparator 32 does not become high after the starting of the engine, the output of the flip-flop 33 remains at the low level and the engine operates at the premium gasoline mode.

As mentioned above, the ignition timing change-over determining portion 3 determines, from the output voltage of the retard controlling voltage generator 31, which gasoline (premium or regular) is used for the engine.

Figure 2:
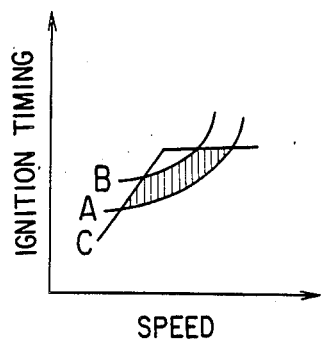
FIG. 2 shows a characteristic curve of ignition timing in relation to the rotational speed of an engine.
Figure 3:
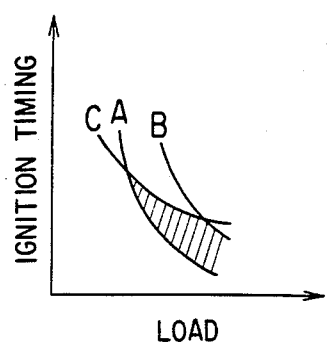
FIG. 3 shows a characteristic curve of ignition timing in relation to a load on an engine.
Figure 7:
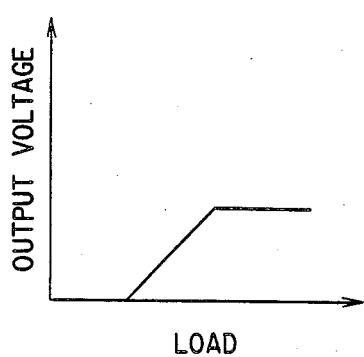
FIGS. 7 and 8 respectively show the output voltage characteristics of a function generator used in FIG. 4 in relation to the load on the engine and the engine speed.
Figure 8:
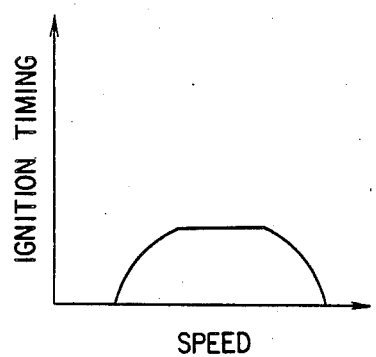

The ignition timing change-over magnitude determining portion 4 determines an ignition timing change-over magnitude from an operating condition of the engine, and provides as an output therefrom a voltage for the change-over of the ignition timing to the phase-shifter 5 according to the determined result of the change-over determining portion 3. The function generator 42 generates voltages corresponding to respective predetermined functions which are respectively illustrated in FIGS. 2 and 3 in relation to the load on the engine as shown in FIG. 7 and the speed of the engine as shown in FIG. 8 in response to the output voltages of the pressure sensor 9 and the F/V converter 10, respectively, and provides as an output therefrom the multiplied value of both of the voltages.

When the output of flip-flop 33 is at the high level (regular gasoline mode), the analog switch 41 is rendered to be in an ON mode whereby the output voltage of the function generator 42 is provided as an input to the ignition timing phase-shifter 5. On the otherhand, when the output of the flip-flop 33 is at the low level (premium gasoline mode), the analog switch 41 is rendered to be in an OFF mode whereby the output of the pressure sensor 9 is not inputted to the phase-shifter 5.

The phase-shifter 5 then phase-shifts the reference ignition timing signal from the reference ignition timing signal generator 6 in the retarding direction according to the output voltages of the function generator 42 which are passed through the analog switch 41 and of the retard controlling voltage generator 31, and provides as an output therefrom an ignition signal of an optimum ignition timing characteristic corresponding to the kind of gasoline being used. This phase-shifter 5 is generally well known in the art of ignition timing control apparatus so that the description thereof is omitted. It is to be noted that the reference ignition timing signal generator 6 provides as an output therefrom the reference ignition timing signal set by the operating condition of the engine such as the speed and the load of the engine. This reference ignition timing characteristic may be determined by, e.g., the operating characteristics of the centrifugal governer of a distributor and a pressure diaphragm, or may be stored in a memory of an electronic advance controlling device.

While the reset circuit 34 in the above embodiment has been used to generate a pulse at the starting time of the engine, a reset pulse may be generated by the detection of the fact that additional gasoline is being poured into the gasoline tank through the detection of the opening/closing operation of the fuel cap of a gasoline tank upon supplying the gasoline or through the detection of a change in a fuel gauge setting. In this case, a backup power source may be added so that the output mode of the flip-flop 33 is memorized even during the stop of the engine.

It is also to be noted that the reference ignition timing preset in the generator 6 may be preset for either one of premium or regular gasoline in which the threshold level of the comparator 32 is required to be varied accordingly.

According to the first embodiment of this invention as above described, in the case where either of regular gasoline or premium gasoline is interchangeably used for an engine, knocks are detected by a knock sensor, determination is made of whether premium or regular gasoline is used based on the detected result, and the reference ignition timing characteristic is changed over to that of either one of premium or regular gasoline depending on the determined result. At the same time, in the change-over of the reference ignition timing, since the change-over magnitude of the ignition timing according to the operating condition of the engine is set, an optimum ignition timing characteristic is provided for either one of premium or regular gasolines.

While a change-over knock control apparatus where only either one of premium or regular gasoline is used for an engine has been described in the first embodiment shown in FIG. 4, this invention can also apply to a knock control where a mixture of premium and regular gasolines is being used for the engine.

Figure 9:
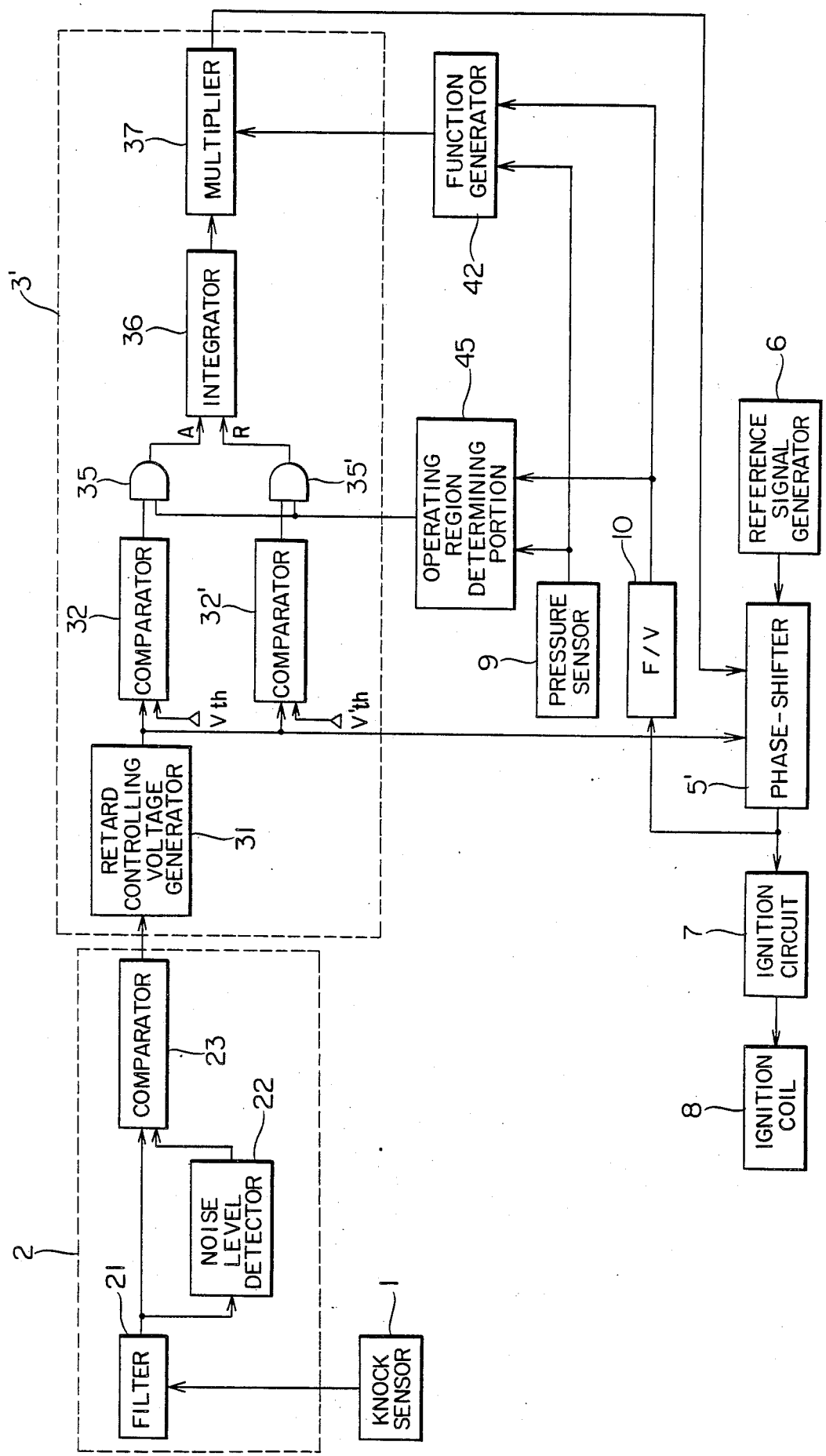
FIG. 9 shows a block diagram of a second embodiment of an ignition timing control apparatus for an internal combustion engine in accordance with this invention.

A second embodiment of an ignition timing control apparatus for an internal combustion engine using mixed gasoline is shown in FIG. 9. As mentioned above, this second embodiment also serves to shorten the change-over ignition timing interval for the knock control between points A and B in FIG. 1, thereby enhancing the responsiveness of the knock control. In addition to this, this embodiment can perform a failsafe function to preclude an erroneous change-over control.

In FIG. 9, the knock deriving portion 2 is connected to an ignition timing displacement determining portion 3' which is composed of a retard controlling voltage generator 31, a second comparator 32, a third comparator 32', first and second AND gate 35 and 35', an integrator 36, and a multiplier 37. The input of the retard controlling voltage generator 31 is connected to the output of the first comparator 23. The comparators 32 and 32' compare the output voltage of the retard control voltage generator 31 respectively with first and second predetermined threshold levels Vth and Vth', the compared results respectively being connected to respective one input of the AND gates 35 and 35'. The respective other input of the AND gate 35 and 35' is commonly connected to the output of an operating region determining portion 45. The integrator 36 has two inputs of which an advancing input is connected to the output of the AND gate 35 and a retarding input connected to the output of the AND gate 35'. The multiplier 37 receives as inputs the output voltage of the integrator 36 and the output voltage of the function generator 42 which has been described in the first embodiment. The operating region determining portion 45 and the function generator 42 together receive as inputs the output voltages of the pressure sensor 9 and the F/V converter 10 as above described.

Three inputs to an ignition timing phase-shifter 5' are respectively connected to the output of the retard controlling voltage generator 31, the output of the multiplier 37, and the reference ignition timing signal generator 6. Accordingly, the ignition timing phase-shifter 5' phase-shifts the reference ignition timing signal provided as an output from the reference ignition timing signal generator 6 in accordance with the output voltages of the retard controlling voltage generator 31 and the multiplier 37, and provides as an output therefrom an ignition signal indicative of the phase-shifted, i.e., displaced ignition timing to the ignition cicuit 7 which causes the ignition coil 8 to develop thereacross a high voltage necessary for the ignition of the engine.

In the second embodiment shown in FIG. 9, the various operations performed until a waveform shown in FIG. 10(b) corresponding to that shown in FIG. 6(b) is obtained as an output from the retard controlling voltage generator 31 are the same as described with reference to the first embodiment shown in FIG. 4 so that the descriptions thereof are omitted.

The second comparator 32 and the third comparator 32' compare the retard controlling voltage from the signal generator 31 with the threshold levels Vth and Vth' respectively. The voltage relationship between Vth and Vth' is set such that $Vmin < Vth < Vth' < Vmax$ for e.g. the maximum value (Vmax) and the minimum value (Vmin) of the retard controlling voltage. The second comparator 32 provides as an output therefrom a high level signal as shown in FIG. 10(c) when the retard controlling voltage from the generator 31 is lower than the first predetermined threshold voltage Vth which is inputed to the comparator 32 for the comparison. The third comparator 32' provides as an output therefrom a high level signal as shown in FIG. 10(d) when the retard controlling voltage from the generator 31 is higher than the second predetermined threshold voltage Vth' which is inputed to the comparator 32' for the comparison.

Figure 10:
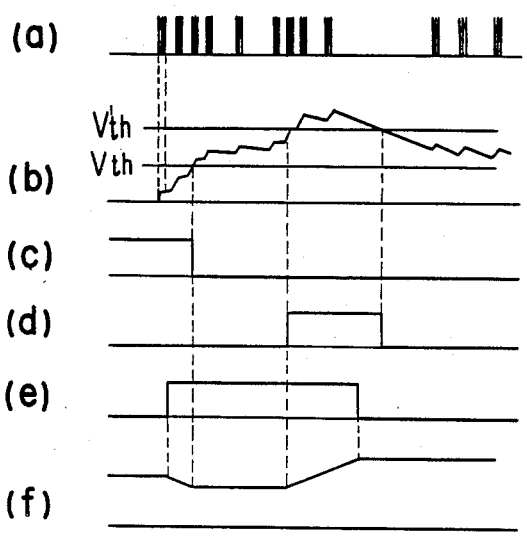
FIGS. 10(a)–10(f) shows waveform graphs for explaining the operations of the various portions of the control apparatus used in FIG. 9.

The integrator 36 gradually decreases its output voltage as shown in FIG. 10(f) when the high level output signal of the comparator 32 is provided to the advancing input of the integrator 36 through the AND gate 35, thereby displacing it in the advancing direction. On the other hand, the integrator 36 gradually increases its output voltage as shown in FIG. 10(f) when the high level output signal of the comparator 32' is provided to the retarding input of the integrator 36 through the AND gate 35', thereby displacing it in the retarding direction. If the advancing and retarding inputs of the integrator 36 are both at the low level, the output voltage of the integrator 36 is held as it is.

As mentioned before, even though such threshold levels Vth and Vth' are preset to determine whether the reference ignition timing is to be displaced in the advancing or retarding direction, this determination can not be necessarily applied to the overall operating region of the engine because for example, in a light load region and in a low speed region the retard controlling voltage may erroneously go above Vth and Vth' even when premium gasoline is used. For the purpose of eliminating such an erroneous determination, the operating region determining portion 45 is provided. The operating region determining portion 45 receives as inputs an operating load information of the engine from the pressure sensor 9 and an operating speed information of the engine through a frequency-voltage conversion of the ignition signal from the ignition timing phase-shifter 5' to form a data map for the operating region based on the load and speed of the engine. Furthermore, an operating region where the output voltage of the integrator 36 may be displaced in the advancing or retarding direction is preset so that it provides as an output therefrom a high level signal as shown in FIG. 10(e) when the operating condition lies in the preset region while otherwise it provides as an output therefrom a low level signal.

Figure 11:
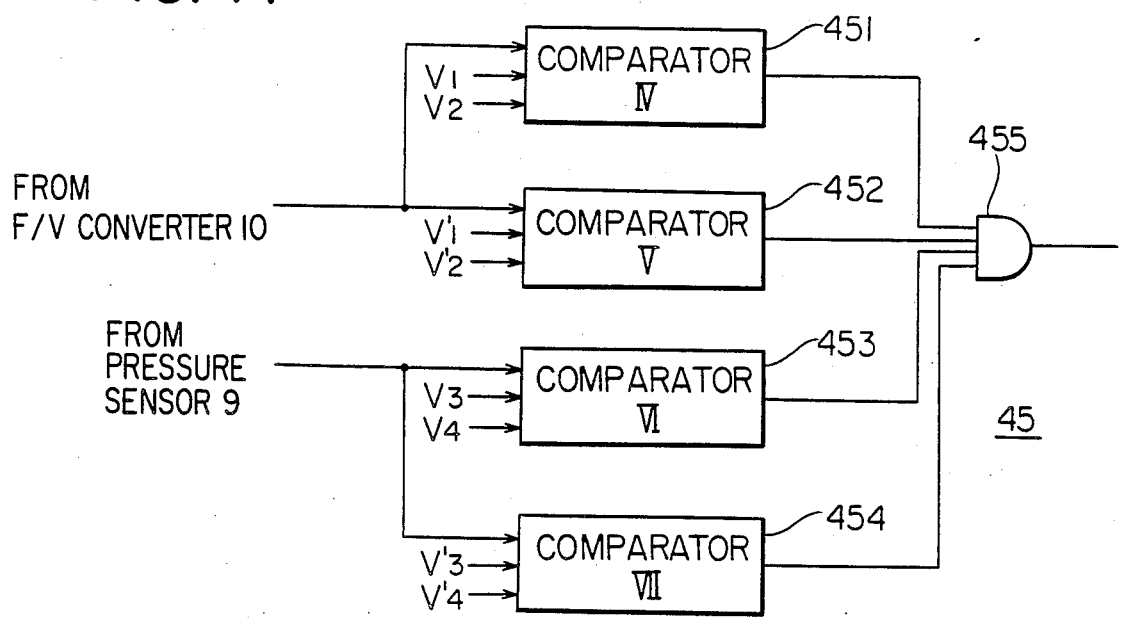
FIG. 11 shows a block diagram of the arrangement of the operating region determining portion used in FIG. 9; and, FIG. 12 shows a map of an operating region of the engine defined by the load and speed on the engine, used in the second embodiment of this invention.

In FIG. 11, there is shown a block diagram of the arrangement of the operating region determining portion 45 which is composed of a fourth comparator 451, a fifth comparator 452, a sixth comparator 453, a seventh comparator 454, and an AND gate 455. The common input of the comparators 451 and 452 is connected to the output of the ignition timing phase-shifter 5′ through the F/V converter 10 to provide as an output therefrom a voltage proportional to the engine speed. The comparator 451 has two threshold levels V1 and V2 to be compared with the output voltage of the F/V converter 10. The comparator 452 also has two threshold levels V1′ and V2′ to be compared with the output voltage of the F/V converter 10. Therefore, when the output voltage of the F/V converter 10 is present between V1 and V2, the comparator 451 provides as an output therefrom a high level signal while otherwise it provides as an output therefrom a low level signal, and when the output voltage of the F/V converter 10 is present between V1′ and V2′, the comparator 452 provides as an output therefrom a high level signal while otherwise it provides as an output therefrom a low level signal.

The input of the comparator 453 is connected to the output of the pressure sensor 9 to receive as an input a voltage proportional to the inlet air pressure of the engine, that is the load information of the engine. The comparator 453 also has two threshold levels V3 and V4 to be compared with the output voltage of the pressure sensor 9. The input of the comparator 454 is also connected to the output of the pressure sensor 9 to receive as an input a voltage proportional to the inlet air pressure of the engine, that is the load information of the engine. The comparator 454 also has two threshold levels V3′ and V4′ to be compared with the output voltage of the pressure sensor 9. Therefore, when the output voltage of the pressure sensor 9 is present between V3 and V4, the comparator 453 provides as an output therefrom a high level signal while otherwise it provides as an output therefrom a low level signal, and when the output voltage of the pressure sensor 9 is present between V3′ and V4′, the comparator 454 provides as an output therefrom a high level signal while otherwise it provides as an output therefrom a low level signal. Then, the AND gate 455 whose inputs are connected to the respective outputs of the comparators 451–454 performs the logical multiplication of the outputs of the comparators 452–455.

Figure 12:
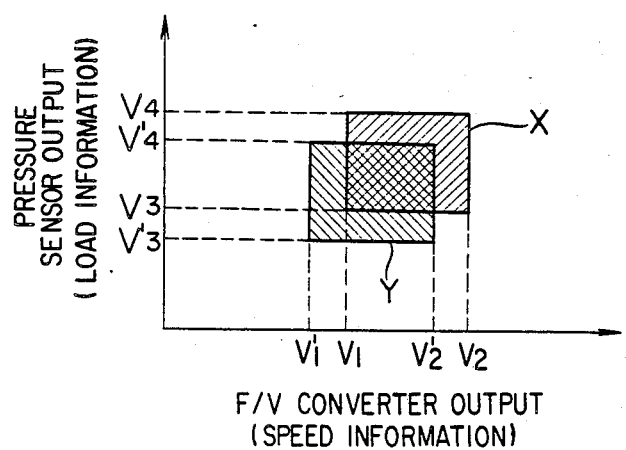

FIG. 12 shows an operating region of the engine represented by the output voltage of the F/V converter 451 (speed information) and the output voltage of the pressure sensor 9 (load information). It will be seen from FIG. 12 that there are two hatched portions X and Y which are called a "map". The hatched portion X designates an operating region defined by a predetermined speed region of V1–V2 as well as a predetermined load region of V3–V4 with the combination of the comparators 451 and 453 while the hatched portion Y designates an operating region defined by a predetermined speed region of V1′–V2′ as well as a predetermined load region of V3′–V4′ with the combination of the comparators 452 and 454. Therefore, only if the operating region of the engine lies in the double hatched portion, i.e., the superposed portion of the hatched portions X and Y, does the operating region determining portion 45 provide as an output therefrom a high level signal through the AND gate 455, as shown in FIG. 10(e).

Then, the AND gates 35 and 35′ control the passing of the output signals of the comparators 32 and 32′ to the integrator 36 by means of the output signal of the operating region determining portion 45. Namely, when the retard controlling voltage from the retard controlling voltage generator 31 is smaller than Vth and when the operating condition of the engine lies in the predetermined superposed map region defined in FIG. 12, the integrator 36 displaces its output voltage in the advancing direction while when the retard controlling voltage is larger than Vth′ and when the operating condition of the engine lies in the predetermined superposed map region defined in FIG. 12, the integrator 36 displaces its output voltage in the retarding direction. Moreover, when the retard controlling voltage is between Vth and Vth′ or when the operating condition of the engine lies outside of the above map region, the integrator 36 holds its output voltage as it is.

Figure 1:
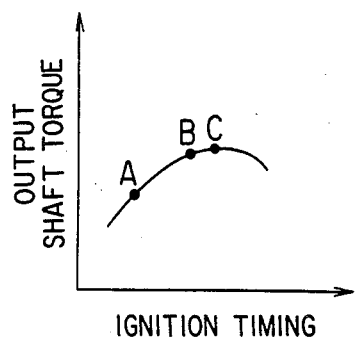
FIG. 1 shows an output shaft torque characteristic of an internal combustion engine as a function of ignition timing.

It is also necessary to set the ignition timing in a region, in the retarding side of point A or B in FIG. 1, where no knocks occur in a vicinity as near as possible to MBT (point C in FIG. 1), to order to operate the engine most efficiently. Therefore, in the case where a mixture of regular and premium gasolines is used, one may control displacement of the ignition timing in the hatched portions in FIGS. 2 and 3 and may adapt the ignition timing for MBT outside of the hatched portions. This concept can therefore be realized by weighing the output voltage of the integrator 36 with a function determined from the characteristics of FIGS. 2 and 3, which is practically formed of the function generator 42 and the multiplier 37. The function generator 42 generates a voltage corresponding to a predetermined function determined from the characteristics of FIGS. 2 and 3 in relation to a load of the engine, obtained from the pressure sensor 9, as shown in FIG. 7 and a speed of the engine, obtained from the F/V converter 10 as shown in FIG. 8, and provides as an output therefrom the multiplied voltage. The multiplier 37 then multiplies the output voltage of the integrator 36 and the output voltage of the function generator 42. This means that the output voltage of the integrator 36 is weighed by the output voltage of the function generator 42.

Subject to the output voltage of the multiplier 37 and the retard controlling voltage from the retard controlling voltage generator 31, the ignition timing phase-shifter 5′ then displaces the phase angle of the reference ignition timing signal set in the reference ignition timing signal generator 6 whereby the most efficiently operate ignition timing for the engine is obtained.

According to the second embodiment as above mentioned, in the case where only either one of premium gasoline or regular gasoline is used or where a mixture of them is used, knocks are detected by a knock sensor, whether or not displacement of the reference ignition timing in the advancing or retarding direction is required is determined from the detected occurrence of knocks, and the reference ignition timing is displaced in angle according to an ignition timing displacement magnitude weighed by the operating condition of the engine, whereby the most efficiently operable ignition timing for the engine is advantageously obtained.

It is to be noted that while the present invention has been described with reference to the above embodiments illustrated in the accompanying drawings, it should not be limited to them but may be applied with various modifications thereof without departing from the spirit of the invention.

We claim:

1. An ignition timing control apparatus for an internal combustion engine having a reference ignition timing comprising:
   a sensing means for sensing vibrations including knocks of said engine;
   knock signal deriving means for deriving knock signals from the output of said sensing means and indicating a knock condition of the engine;
   means for initially setting the reference ignition timing in accordance with one of a plurality of modes corresponding to different octane ratings of gasoline fuel used in the engine;
   an ignition timing change-over determining means for determining from said knock signals derived by said knock signal deriving means whether or not change-over of the reference ignition timing from the initial setting is necessary according to the indicated knock condition and the mode corresponding to the initial setting of the reference ignition timing;
   an operating condition sensing means;
   a change-over magnitude determining means for correcting the change-over magnitude of the reference ignition timing according to the operating condition of said engine from said condition sensing means and the output of said ignition timing change-over determining means; and
   an ignition timing change-over means for changing the reference ignition timing according to the output of said change-over magnitude determining means.

2. An ignition control apparatus for an internal combustion engine as claimed in claim 1 wherein said change-over magnitude determining means includes an operating condition determining means supplied with signals from said operating condition sensing means for determining the operating condition of said engine.

3. An ignition timing control apparatus for an internal combustion engine having a reference ignition timing comprising:
   a sensing means for sensing vibrations including knocks of said engine;
   knock signal deriving means for deriving knock signals from the output of said sensing means and indicating a knock condition of the engine;
   an ignition timing change-over determining means for determining from said knock signals derived by said knock signal deriving means whether or not change-over of the reference ignition timing from a setting is necessary according to the indicated knock condition and a mode associated with a fuel used in said engine;
   an operating condition sensing means;
   a change-over magnitude determining means for correcting the change-over magnitude of the reference ignition timing according to the operating condition of said engine from said condition sensing means and the output of said ignition timing change-over determining means; and
   an ignition timing change-over means for changing the reference ignition timing according to the output of said change-over magnitude determining means;
   said ignition timing change-over determining means including a retard controlling voltage generator for determining an ignition timing retard angle to continuously retard the reference ignition timing changed over by said ignition timing change-over means.

4. An ignition timing control apparatus for an internal combustion engine having a reference ignition timing comprising:
   a sensing means for sensing vibrations including knocks of said engine;
   knock signal deriving means for deriving knock signals from the output of said sensing means and indicating a knock condition of the engine;
   means for initially setting the reference ignition timing in accordance with one of a plurality of modes corresponding to different octane ratings of gasoline fuel used in the engine;
   an ignition timing change-over determining means for determining from said knock signals derived by said knock signal deriving means whether or not change-over of the reference ignition timing from the initial setting is necessary according to the indicated knock condition and the mode corresponding to the initial setting of the reference ignition timing;
   an operating condition sensing means;
   a change-over magnitude determining means for correcting the change-over magnitude of the reference ignition timing according to the operating condition of said engine from said condition sensing means and the output of said ignition timing change-over determining means; and
   an ignition timing change-over means for changing the reference ignition timing according to the output of said change-over magnitude determining means, including an operating condition determining means supplied with signals from said operating condition sensing means for determining the operating condition of said engine;
   said change-over magnitude determining means including a function generator for developing a voltage corresponding to a predetermined function obtained from the ignition timing characteristics of said engine depending on the output of said operating condition determining means, and a switch means for passing the developed voltage of said function generator to said ignition timing change-over means in response to the output of said ignition timing change-over determining means.

5. An ignition timing control apparatus for an internal combustion engine as claimed in claim 4 wherein said switch means comprises an analog switch.

6. An ignition timing control apparatus for an internal combustion engine having a reference ignition timing comprising:
   a sensing means for sensing vibrations including knocks of said engine;
   knock signal deriving means for deriving knock signals from the output of said sensing means;
   means for initially setting the reference ignition timing in accordance with one of a plurality of modes corresponding to different octane ratings of gasoline fuel used in the engine;
   an operating condition sensing means;
   a displacement magnitude determining means for determining a displacement magnitude for the reference ignition timing of said engine in accordance with the output of said knock signal deriving means and the mode corresponding to the initial setting of the reference ignition timing;

an ignition timing displacement means for displacing the reference ignition timing from the initial setting by said displacement magnitude according to the output of said displacement magnitude determining means; and a correction means for correcting said displacement magnitude for the reference ignition timing according to an operating condition of said engine.

7. An ignition timing control apparatus for an internal combustion engine as claimed in claim 6 wherein said displacement magnitude determining means includes a retard controlling voltage generator for determining an ignition timing retard angle to continuously retard the reference ignition timing displaced by the output of said displacement magnitude determining means.

8. An ignition timing control apparatus for an internal combustion engine having a reference ignition timing comprising:

a sensing means for sensing vibrations including knocks of said engine;

knock signal deriving means for deriving knock signals from the output of said sensing means;

an ignition timing change-over determining means for determining from said knock signals derived by said knock signal deriving means whether or not change-over of the reference ignition timing is necessary from an initial setting to a different setting according to a knock condition associated with one of premium and regular gasoline fuel used for said engine;

an operating condition sensing means;

a change-over magnitude determining means for correcting the change-over magnitude of the reference ignition timing according to the operating condition of said engine from said condition sensing means and the output of said ignition timing change-over determining means;

said ignition timing change-over determining means including a retard controlling voltage generator for determining an ignition timing retard angle to continuously retard the reference ignition timing changed over by said ignition timing change-over means, a comparing means for comparing the output of said retard controlling voltage generator with a predetermined threshold level set higher that the output of said retard controlling voltage generator when premium gasoline is used, and a storage means for storing the output of said comparing means; and an ignition timing change-over means for changing over the reference ignition timing according to the output of said change-over magnitude determining means.

9. An ignition timing control apparatus for an internal combustion engine as claimed in claim 8 wherein said ignition timing change-over determining means further includes a reset circuit for resetting said storage means at the starting time of said engine.

10. An ignition timing control apparatus for an internal combustion engine having a reference ignition timing comprising:

a sensing means for sensing vibrations including knocks of said engine;

knock signal deriving means for deriving knock signals from the output of said sensing means;

an ignition timing change-over determining means for determining from said knock signals derived by said knock signal deriving means whether or not the change-over of the reference ignition timing is necessary from the knock condition associated with a fuel used for said engine;

an operating condition sensing means;

a change-over magnitude determining means for correcting the change-over magnitude of the reference ignition timing according to the operating condition of said engine from said condition sensing means and the output of said ignition timing change-over determining means, said change-over magnitude determining means including an operating condition determining means for determining the operating condition of said engine having a pressure sensor for sensing the inlet air pressure of said engine and a frequency-voltage converter for converting the ignition timing provided by said ignition timing change-over means into a voltage corresponding to the speed of said engine; and an ignition timing change-over means for changing over the reference ignition timing according to the output of said change-over magnitude determining means.

11. An ignition timing control apparatus for an internal combustion engine having a reference ignition timing comprising:

a sensing means for sensing vibrations including knocks of said engine;

knock signal deriving means for deriving knock signals from the output of said sensing means;

an ignition timing change-over determining means for determining from said knock signals derived by said knock signal deriving means whether or not the change-over of the reference ignition timing is necessary from the knock condition associated with a fuel used for said engine;

an operating condition sensing means;

a change-over magnitude determining means for correcting the change-over magnitude of the reference ignition timing according to the operating condition of said engine from said condition sensing means and the output of said ignition timing change-over determining means, said change-over magnitude determining means including an operating condition determining means for determining the operating condition of said engine, and an ignition timing change-over means for changing over the reference ignition timing according to the output of said change-over magnitude determining means;

said change-over magnitude determining means further including a function generator for developing a voltage corresponding to a predetermined function obtained from the ignition timing characteristics of said engine depending on the output of said operating condition determining means, and a switch means for passing the developed voltage of said function generator to said ignition timing change-over means in response to the output of said ignition timing change-over determining means;

said ignition timing change-over means including a reference ignition signal generator for generating the reference ignition timing as a preset signal, and a phase-shifting means for phase-shifting the reference ignition timing according to the output of said change-over magnitude determining means and the output of said retard phase-shifting means being connected to said frequency-voltage converter.

12. An ignition timing control apparatus for an internal combustion engine as claimed in claim 11 wherein said ignition timing change-over means further includes an ignition circuit connected to said phase-shifting means, and an ignition coil caused by said ignition circuit to develop thereacross as ignition voltage.

13. An ignition timing control apparatus for an internal combustion engine having a reference ignition timing comprising:
a sensing means for sensing vibrations including knocks of said engine;
knock signal deriving means for deriving knock signals from the output of said sensing means;
an operating condition sensing means;
a displacement magnitude determining means for determining from the output of said knock signal deriving means a displacement magnitude for the reference ignition timing of said engine, said displacement magnitude determining means including a retard controlling voltage generator for determining an ignition timing retard angle to continuously retard the reference ignition timing, a first comparing means for comparing the output of said retard controlling voltage generator with a first predetermined threshold level, the reference ignition timing being displaced in the advancing direction when the output of said retard controlling voltage generator is below said first predetermined threshold level, and a second comparing means for comparing the output of said retard controlling voltage generator with a second predetermined threshold level, the reference ignition timing being displaced in the retarding direction when the output of said retard controlling voltage generator is below said second predetermineed threshold level;
an ignition timing displacement means for displacing the reference ignition timing by said displacement magnitude according to the output of said displacement magnitude determining means; and
a correction means for correcting said displacement meagnitude for the reference ignition timing according to an operating condition of said engine.

14. An ignition timing control apparatus for an internal combustion engine as claimed in claim 13 wherein said displacement magnitude determining means further includes a pressure sensor for sensing the inlet air pressure of said engine, a frequency-voltage converter for converting the reference ignition timing retarded by said retard controlling voltage generator into a voltage corresponding to the speed of said engine, an operating region determining means responsive to the outputs of said pressure sensor and said converter for determining the operating region of said engine, a first multiplication means for logically multiplying the outputs of said first comparing means and said operating region determining means, and a second multiplication means for logically multiplying the outputs of said second comparing means and said operating region determining means.

15. An ignition timing control apparatus for an internal combustion engine as claimed in claim 14 wherein said displacement magnitude determining means further includes an integrating means having an advancing input connected to the output of said first multiplication means and having a retarding input connected to the output of said second multiplication means, and a multiplier connected to said integrating means.

16. An ignition timing control apparatus for an internal combustion engine as claimed in claim 15 wherein said operating region determining means comprises a superposed map of two operating regions of said engine in which knocks may erroneously arise in the reference ignition timing for of both of premium and regular gasolines.

17. An ignition timing control apparatus for an internal combustion engine as claimed in claim 16 wherein said correction means includes a function generator for developing a voltage corresponding to a predetermined function obtained from the ignition timing characteristics of said engine depending on the output of said pressure sensor and said frequency-voltage converter.

18. An injection timing control apparatus for an internal combustion engine as claimed in claim 17 wherein said ignition timing displacement means includes a reference ignition signal generator for generating the reference ignition timing as a preset signal, and a phase-shifting means for phase-shifting the reference ignition timing according to the output of said multiplier and the output of said retard controlling voltage generator, the output of said phase-shifting means being connected to said frequency-voltage converter.

19. An ignition timing control apparatus for an internal combustion engine as claimed in claim 18 wherein said ignition timing displacement means further includes an ignition circuit connected to said phase-shifting means, and an ignition coil caused by said ignition circuit to develop thereacross an ignition voltage.

* * * * *